US007136512B2

(12) United States Patent
Burns

(10) Patent No.: US 7,136,512 B2

(45) Date of Patent: Nov. 14, 2006

(54) SELF-SERVICE ENTRY CONTROL SYSTEM

(76) Inventor: Jeffrey R. Burns, 2092 Grand Island Blvd., Grand Island, NY (US) 14072

( * ) Notice: Subject to any disclaimer, the term of this patent is extended or adjusted under 35 U.S.C. 154(b) by 415 days.

(21) Appl. No.: 10/073,393

(22) Filed: Feb. 12, 2002

(65) Prior Publication Data

US 2003/0151761 A1 Aug. 14, 2003

(51) Int. Cl.
*G06K 9/00* (2006.01)

(52) U.S. Cl. ..................... 382/118; 235/380; 340/5.53; 348/156; 713/186

(58) Field of Classification Search ........ 382/115–124; 713/182–186, 200, 202
See application file for complete search history.

(56) References Cited

U.S. PATENT DOCUMENTS 4,991,205 A * 2/1991 Lemelson .................. 713/186
4,993,068 A * 2/1991 Piosenka et al. ............ 713/186
6,233,588 B1 * 5/2001 Marchoili et al. .......... 707/200
6,341,169 B1 * 1/2002 Cadorette et al. ........... 382/115
2001/0026631 A1 * 10/2001 Slocum et al. .............. 382/115
2003/0196097 A1 * 10/2003 Korosec et al. ............ 713/185

* cited by examiner

*Primary Examiner*—Jingge Wu
*Assistant Examiner*—Charles Kim

(57) ABSTRACT

A system for the automatic generation of a pre-cleared photo identification and limited access parameter document to a limited access facility is disclosed wherein a person seeking entry to a secure premises presents himself before a self-service computerized array which directs selected queries to the person that require the person to input data which relates to personal identification and entry purpose, which input data is automatically compared by the array to digitized data contained in one or more data storage banks and if such comparison falls within pre-established standards, generates a document, card, badge, label or the like which conspicuously photo-identifies the user and the parameters of entry to the restricted access area.

15 Claims, 1 Drawing Sheet

SELF-SERVICE ENTRY CONTROL SYSTEM

This invention relates to a visitor response activated, system and apparatus for automated clearance to controlled access facilities and the generation of photo identification for use therein. The system and apparatus is particularly suitable for use in automatically monitoring and controlling entry, egress and on-site movements of occasional visitors to secure facilities.

BACKGROUND OF THE INVENTION

There is in increasing need to automatically control and monitor the entry, egress and on-site movements of occasional visitors, who have access to secure facilities.

Schools, are generally perceived as secure facilities for children, yet have a flow of occasional visitors, such as substitute teachers, parents and repair personnel into and out of the facility during a typical day who may not personally be known to the permanent school staff. The monitoring of these individuals while on school premises is generally loosely observed by the permanent on-site staff, but typically their purpose and reason for entry and on-site movement is only casually challenged by a receptionist or other school personnel that might be stationed close enough to the entry way of the building to observe the flow. It's rare for schools and many other similar facilities to afford an employee dedicated solely to guarded challenge of individuals entering or exiting the premises, and even rarer are they adequately trained for the job, so that the task thereof is frequently poorly done.

Schools are in a constant battle between the social ideal of individual freedom and the responsibility to provide a safe academic haven. Most schools reject highly visible and personally intrusive guarded challenge systems, and the result is generally a staff employee, who amongst many other jobs has a responsibility to intercept visitors and either through personal recognition, guess or just plain intuition, determine whether or not the visitor is the person alleged to be, is properly authorized to be there, and/or whether or not the visitor might represent a threat to the facility or others who may be within the facility. Even when the identification of an unrecognized person is requested, it rarely goes beyond a cursory look at a driver's license or the like to confirm whom the person alleges to be, as distinct from any awareness of any possible threat the person might bring.

Methods have been proposed to automate identification and entry of visitors, but generally such methods still rely upon the cooperative participation of a staff employee who is left to personally review identification provided by the visitor, and perhaps verify the purpose and parameters of entry. The decision to allow entry or not, is then made by the staff member who is generally ill equipped to confront or otherwise deal with a suspicious visitor seeking entry.

The problem with prior methods is that they are labor intensive, requiring the skilled efforts of a specially trained employee to be accomplished appropriately. Finding an employee specifically dedicated and trained for appropriate face-to-face interrogation of a visitor and generation of an identity card or the like is difficult, especially one who also may be assigned other competing duties and must accomplish same while being constantly disrupted with such competing duties. Another problem is that there is no adequate method for assuring the consideration of updated data. For example, the identification used by the visitor may be invalid or false, or the visitor may be of unsavory character or may have recent disqualifying incidents which are not reflected in the identification.

One object of the invention is to provide a self-operated, photo-identification system, which automatically searches available data sources and generates a printed photo-identification card, label, badge or the like, or aborts the generation thereof based upon data obtained from said search.

Another object of the invention is to provide a self-operated, photo-identification, secure facility entry system which assigns parameters for entry to the facility and generates a photo-identification card, badge, label or the like comprising such parameters, which can be conspicuously seen by other personnel during the visit.

A further object of the invention is to provide a photo-identification system which automatically generates identification of a visitor by comparing current photo and record identity and visitor entered data with state automotive licensing records, penal system records and current computer entered data and automatically advise the user and/or receptionist to disqualifying attributes and/or generate an appropriate identification for temporary use.

SUMMARY OF THE INVENTION

The system of the present invention generally comprises a computerized array arranged to automatically provide audio and/or visual directions to a self-service casual visitor, and to solicit data entry responses which are automatically compared to known data which may be stored within the array and/or to data at remote data storage sites. The array is programmed to solicit explicit data from the visitor user, to compare such data to stored data and to evaluate the comparison to determine the authenticity of the responses solicited and characterize the acceptability or non-acceptability of entry by the user into a restricted access area. Upon determination of a positive acceptability, the array automatically assigns parameters of entry to the user into a restricted access area and generates a photo-identification document such as a label, badge, card or the like comprising key data which can be conspicuously worn to identify the user and the parameters of entry while in the restricted access area. Upon determination of non-acceptability or improper data entry, the array provides a signal to the user and/or control personnel for intervention, entry denial or the like.

One or more arrays may be arranged at a facility or a plurality of arrays may be arranged at a plurality of facilities all in electronic communication with each other and/or one or more central data storage sites.

A prime advantage of self-service entry determination and photo-identification generation by the computerized array, is that data can be quickly and securely updated, without public broadcast to multiple facility staff, to respond to an immediate threat and/or to accommodate normal daily scheduling changes. Secondarily it subjects all casual visitors to a dispassionate questioning regiment and response sequence without raising animosity to individual monitoring personnel. The mere presence of the system discourages malevolent attempts at entry and the requirement to respond to machine generated queries for entry, increases the probability of discovering an undesirable visitor, while generating a retrievable record of the visitor's efforts, including a digitized photo.

In its simplest form a computerized array comprises a computer, PC video monitor, camera, card swipe data entry means, printer means and user interactive data entry means and data storage means arranged for user response generation of a photo identification badge, card, label or the like document. In a preferred arrangement, a monitor, digitized camera, card swipe data entry means, printer means and user interactive data entry means are arranged within a common housing. The monitor is positioned for convenient approach and viewing by the user; the card swipe data entry means and user interactive data entry means are positioned for convenient hands-on operation by the user; the camera(s) is positioned to enable photograph recording of at least the face of the user during interaction; and the printer is positioned to eject a printed card, badge, label or the like from the array for convenient retrieval by the user.

In its simplest operating form, signs or the like direct a visitor to the monitor screen which contains a series of computer generated queries that require data entry to be made by the visitor to initiate the identification process. User data entry may be by directed touch screen activation, key pad, keyboard, card swipe data entry and the like. The directions may be computer generated audio message and/or by visual message appearing on the monitor screen. An initial series of questions are generally presented to initiate the process and subsequent queries focus the computerized data search and information retrieval process as may be appropriate.

In one step of the process, the computer generates a series of directions to the user to enable the taking of a facial photograph for use in a completed printed identification card, for record storage and for comparison as may be appropriate from available photo data storage sites. Thus, for example, audio and/or visual messages are generated by the computer directing users to position their body in such manner that a camera(s) can obtain an appropriate photo(s) for printing on the card and/or as collected data for storage for later retrieval. In a preferred method, the image collected by the camera is shown in the monitor screen and as the user views the screen, he is directed to head and/or body movements which position his facial image within defined margins generated in the monitor to provide an appropriate posed identity photo. The desired identity photo can be selected automatically by the array or at the command of the user and is generally stored as record data for recall as appropriate. In a most preferred method, additional identification photos are secretly taken at approach to the array or during the questioning process, and are stored for retrieval in addition to the posed identity photo.

In another step of the process, the user is directed to provide identifying card swipe data from common conventional identification means such as driver's license, credit cards or the like, with or without the input of specific other data from user keyboard and/or key pad interaction in regard to written queries or touch response selections provided at the monitor and/or audio inquiries, which correlate the proffered identification and/or specific other data with visitor and/or the purpose of the visit.

It is generally contemplated but not essential that the computerized array will be capable of automatic multitasking during the receipt of data input from the visitor to automatically initiate and carry-on multiple different searching tasks as information is being received without significant interruption or delay of the process. Thus, a series of responses to standard initial identity quires such as visitor name and address, may coincidentally trigger a search of data comprised in the array and/or a central data storage for comparison which in turn may trigger particular response tailored subsequent quires.

Thus, in a typical school district, data may be stored in an available central data storage means and/or controlling array with computerized arrays arranged at various disparate schools for access to particular facilities. Each array may be in electronic communication with the central data storage means and/or be independent therefrom in determination of various acceptable or non-acceptable visitors, parents, students, teachers, staff, repair personnel or the like and may contain various defined parameters under which access may be acceptable or non-acceptable for entry or denial of entry of each, and the information provided by a visitor is automatically compared thereto by the computer for acceptability or non-acceptability. Each array and/or central controlling array may also be interactive through the internet or similar service with various further remote data storage sites, for example a motor vehicle licensing bureau data bank, public criminal watch file data bank, pedophile watch file data bank or the like for comparison as to acceptability or non-acceptability of the individual.

Camera photo data taken at an array can be compared to digitized photo data in existing central or on-site data storage, for example school photo records of staff, teachers, students and even parents and repair persons, for comparative identification. Camera photo data may be compared to non-acceptable individuals who might be found in criminal files and/or public watch files, motor vehicle licensing files, military records and the like. It is pointed out in this regard that multiple photo data banks are commonly maintained which are enabled for identity retrieval based upon facial photos comprising a plurality of common characteristics assigned by a computer program, and it is contemplated that a preferred embodiment of the invention will include enabling programming to automatically search and compare the photo data taken by the camera of the array, with data in such data banks.

It is contemplated that the extent of searching and comparison of data by the array will be pre-established by each school district or school contained therein, and generally function without the necessity of direct participation by the faculty staff unless an alarm signal of misuse or non-entry is given by the array. Alarm signals may be secret from the user and may be silent notification to appropriate staff. Thus in a typical operation an acceptable casual visitor will directed to the array where he will be photographed, identification and entry data entered and automatically compared, verified and recorded and the array will print a conspicuous current photo ID reciting name, status, purpose of entry, entry parameters and validity period which may be required to be worn throughout entry. The printed badge or label may be color, number, sized or otherwise coded to a specific day, area or period of entry.

It is contemplated that a self-service device of the invention will be positioned in a reception area generally within the casual view of staff charged with controlling entry into the facility and that the facility has means for monitoring the entry and egress of persons to and from the reception area. In the ordinary course of events the visitor approaches the array, the search of data and confirmation of acceptability occur without incident, the ID is printed and the visitor is allowed entry without further adieu. In the event there is a signal of misuse or rejection, the staff can query the visitor or sound appropriate alarm as may be appropriate.

The array may be used to provide permanent badges and photo ID of students, teachers and staff enrolled at the school and the ID may contain encrypted data for card swipe identification and/or recordation of participation at various activities and enabled locations associated with the school. For example, monitoring and determinations of accessibility to books, instruments, sporting equipment, meals and the like of students, teachers and the like can be through an array generated label, badge or card swipe ID. Student photos may be generated by the array for various activities. Array generated photo ID's may provide reduced fee entry to events or the like and strategically located card swipe data entry means may be arranged to record activities as desired.

DETAILED DESCRIPTION OF THE INVENTION

Figure 1:
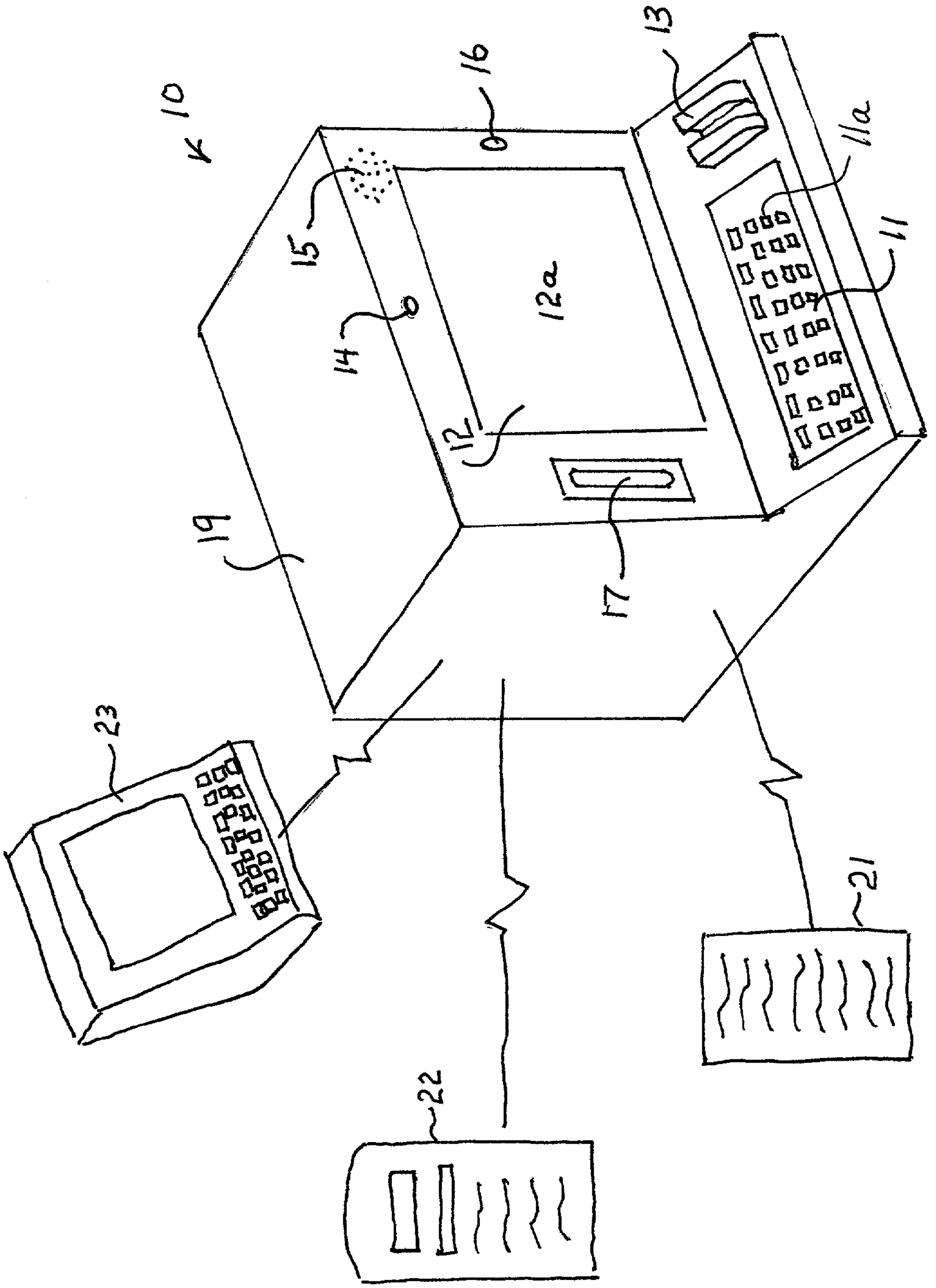
FIG. 1 is a diagrammatic illustration of components of a system of the invention.

Referring now to FIG. 1, therein is illustrated one embodiment of a school entry system of the invention, wherein a self-contained computer array 10 is depicted as comprising a unitary housing 19, comprising a keyboard 11, PC monitor 12, card swipe data entry means 13, screen border mounted camera 14, audio speaker 15, microphone 16, and printer means 17, in electronic communication with a controlling computer system. The illustrated array, comprises an internalized controlling computer system (not shown), generally comprising a controller means, comparitor means, computing means, data storage means and means for remote communication, but it should be understood that such controlling computer system may be remote from the array itself. In the illustrated embodiment the controlling computer system of the array is in enabling communication with a remote data storage means 21, central computer system 22 and adjacent monitoring means 23.

Remote data storage means 21 generally illustrates one or more governmental and/or private data storage and/or data retrieval sites assessable through telephonic, internet or the like communication, which maintains electronically searchable records associated with State, Federal and/or International, motor vehicle driver licensing data sites, criminal identification and/or criminal watch sites, public pedophile or the like watch sites, military record sites and the like.

Central computer means 22, generally illustrates a main computer system of the school and/or a plurality of schools and/or school districts and/or multi-district centralized data storage and retrieval sites, which maintain records regarding visitors and/or employees. Central computer means 22, can also comprise a centralized control at a school, school district and/or multi district site for central computerized operation of one or more arrays.

Adjacent monitoring means 23, generally illustrates one or more terminal stations in communication with one or more self-contained array's, which is arranged for convenient accessibility by on-site school staff or the like to monitor and/or assist and/or provide addition data regarding visitor entry as may be appropriate.

In general operation of the invention, a casual visitor is directed to the array, generally by signage or the like, wherein the internalized computer system and/or centralized system is pre-programmed to proffer queries in response to an initiating action by the visitor. In a typical programmed arrangement, the visitor is generally first queried as to name and reason for visit, with subsequent queries being posed to the visitor in accord with the visitor's response to previous questions and comparison to data retrieved from a data storage means in regard to same.

The general interaction among components of the array is exemplified by an automated analysis of a visitor to a school facility who ostensively presents himself as a substitute replacing an absent permanent teacher.

The visitor is directed to the array and observes screen 12*a* of PC monitor 12, which displays a general advisement, generated by the internalized computer, that no visitor will be granted entry to the facility without conspicuous wearing of a valid photo identification document generated by the array; that information pertaining to the identity of the visitor and the purpose of his visit will be required from the visitor to generate such document; that such information provided by the visitor will be retained in a permanent file; and, directions for the visitor to activate generation of the photo ID by engaging return key 11*a* of keyboard 11.

Upon activation by the visitor, the internalized computer is programmed to generate first queries on monitor screen 12*a*, for example queries which instruct the visitor to sequentially enter full name and resident address in defined spaces shown on the screen using keyboard 12. As the visitor enters the responsive data to the name query, the internalized computer of the array automatically generates a temporary data file regarding that response and responses to subsequent queries and generates a multi-tasking directive causing camera(s) 14 to secretly take and similarly temporarily save one or more digital photos of the user. Upon completion of entry of the name, the internalized computer generates a further multi-tasking directive, searching permanent data storage files of the array or of centralized data storage means 22 to compare name matches with other files contained in the array or central storage means 22. Similarly, upon completion of entry of address the internalized computer compares address with permanently stored data in the array and/or centralized data storage means 22. Generally, the first queries establish a base identity of the visitor for comparison to permanent stored data relating to previous use of the array by the visitor and/or pre-entered data confirming an established appointment and/or identity of the named visitor. Generally if the name query conforms to an established stored identity, a further query concerning a pre-established code or the like is made to confirm the identified user.

The name and address queries are generally followed by queries regarding the purpose of visit, generally by providing a selection of purposes from which the user can select, with user's selection immediately instituting a plurality of tasks by the computer system. For example, a list of purposes is displayed on the screen including a designation of substitute teacher, whereupon selection thereof by the visitor immediately institutes a multi-tasking data search by the computer including a search of logged entries to the array or central data storage 22 confirming a pre-established appointment by the named visitor, the teacher and/or class that is being substituted for or in, parameters of entry of the replacement, and a search of pre-recorded data relating to acceptable substitute teachers.

In most circumstances, the expected substitute teacher has already been pre-cleared by the school in regard to character and even has stored photo data of record for further comparison with a formal photo of the individual. Generally, in such instance, the next queries are directed toward enabling the taking of a full facial photo of the visitor, wherein such photo is automatically compared by the internalized computer to the stored photo data of record and if comparison is within the limits of pre-programmed photo comparison, an appropriate identification document is printed and ejected at printer 17 with instructions for wearing same appearing on screen 12*a*.

In the event the substitute teacher is expected and known by identity, but not pre-cleared, the programming may request the entry of drivers license and/or credit card or the like data through card swipe data entry means 13. In such event generally the card swipe data is compared to the identity data previously given and expected and known identity data for conformance and if conforming the pre-programming initiates a search of remote data sites 21 for entry disqualifying data. For example, the pre-programming may initiate a search of driver licensing files, criminal watch files, pedophile files or the like for name recognition. Alternately, formal facial photographing may be instituted prior to such remote search and data obtained therefrom may be compared to remote data photographic files for name and/or photo identity comparison.

During each of the queries and responses adjacent monitoring means 23 retains a sequential viewable display of the queries and responses of the visitor, as well as a viewable display of the progress of the comparisons and/or results of the searches undertaken by the internalized computer. Alarm means are provided which alert attending staff to any problem and/or irregularity which may have been detected during the process and appropriate keyboard or the like means may be provided thereat to enable remote override of non-critical irregularities and/or problems by an attending staff member and/or specific disqualification based upon previously unknown data for the staff to take appropriate action with or without the knowledge of the visitor.

Generally, if the comparison identifies no variance the array automatically prints an identification document containing a conspicuous legend for entry including the photo of the substitute teacher. The data entered by the visitor is permanently stored at the array or at a centralized data storage site and becomes a record for further identification, financial data regarding payment and/or attendance and/or other reporting records that might be pertinent in regard to monitoring of substitute teachers.

In such example, the array automatically does the labor intensive work of confirming the identity of the visitor, the validity of the visit, establishing the parameters of entry and printing the formal entry identification document without need for staff intervention, and even provides a retrievable electronic record for use in accounting for payment for services by the visitor and recording absence of the permanent teacher, which can be automatically transmitted to a central facility computer which retains records for enabling the administration of the school.

In another scenario, a visitor to a school purports to be a plumber sent by a contracting firm to inspect and repair a sink. As with the substitute teacher, the visitor is directed to the array which displays a general advisement on screen 12*a* concerning conspicuous wearing of a valid photo ID and the necessity to provide information for permanent storage. Upon activation by the visitor, the first queries instruct the visitor to sequentially enter full name and resident address and as the visitor enters the responsive data to the name query, the internalized computer of the array automatically generates a temporary data file and multi-tasking photographing of the user. With entry of the name and address, the permanent data storage files of the array or of centralized data storage means 22 are searched to compare name and address matches with other files to establish a base identity of the visitor for comparison to permanent stored data relating to previous use of the array by the visitor and/or pre-entered data confirming an established appointment and/or identity of the named visitor. Generally if the name query conforms to an established stored identity, a further query concerning a pre-established code or the like is made to confirm the identified user.

The visitor is queried as to purpose whereupon the selection of repairmen or the like institutes a series of queries regarding contractual or the like authority which institute multi-tasking searches for example a search of on-site logged entries confirming scheduled repairs, inspections or the like, companies assigned to do plumbing repairs and companies and workers who are pre-cleared and pre-identified for doing plumbing repairs. In the event the identified worker is identified and corresponds to the search data, formal photo is taken compared to pre-existing photo data and an appropriate photo ID document is printed with conspicuous identification of entry parameters, together with recordation of the entry and confirmation of services for administrative accounting, etc.

In the event the repairman is expected and known by identity, but not pre-cleared, as with the substitute teacher, the programming may request the entry of drivers license and/or credit card or the like data through card swipe data entry means 13 for comparison to the identity data previously given and expected and known identity data, for conformance and if conforming the pre-programming initiates a search of remote data sites 21 for example, a search of driver licensing files, criminal watch files, pedophile files or the like for name recognition. Alternately, formal facial photographing may be instituted prior to such remote search and data obtained therefrom may be compared to remote data photographic files for name and/or photo identity comparison.

Generally, the programming of the array is arranged to search, compare and confirm identities and entries of persons through on-site data sources first before instituting searches of remote data banks such as criminal watch files, pedophile files and the like. Thus, for example the array or central computer means comprises a parental initiated alert denying release of a child to an estranged parent or relative visitor, which alert precludes the array from generating an ID document and alerts an administrator monitoring the array so that denial of release occurs without need for child or teacher to participate in identification and/or confrontation of the visitor and enables administrative contact of police or the like authorities even before confrontation with the visitor. Likewise, the array comprises the identity of pre-approved visitors for release, parameters of release and even qualifying answers to enable release, such that the pre-approved visitor is quickly identified and appropriate photo's taken to enable convenient release without incident or unnecessary guessing.

The array can be a positive initial identity tool for new employees, students and the like, providing initial confirmation and/or assessment of identity at employment and/or attendance at a school, enabling convenient automated and computer retrievable background checks at initial employment and/or at various intervals thereafter. Thus a policy that each employee and/or student undergo generation of an photo identification entry document before the array at the start of a school year or as otherwise defined may be instituted, wherein students are photographically compared to missing child files and the like with teachers, administrative employees and the like being checked against criminal or the like files. Normal school pictures can be digitally taken by a school photographer and the data therefrom input to the array for analysis and comparison.

I claim:

1. An automated method for visitor clearance to a controlled access facility and the generation of a photo-identification access document comprising:

providing an arrangement proximate an entry to a controlled access facility, said arrangement comprising video monitor means, digital photographing means, printing means and visitor responsive data input means;

providing computer means comprising controller means, data storage means and comparitor means in electronic communication with said arrangement, said data storage means containing data relating to visitor entry;

means directing a visitor presented before said video monitor to input data by said visitor responsive data input means, in response to a plurality of queries posed to said visitor by said arrangement;

wherein said data input to said visitor responsive data input means comprises name identification data of said visitor and data regarding the purpose of the visit by said visitor;

Wherein facial photographic data of said visitor is taken by said digital photographing means;

wherein said computer means automatically compares said facial photographic data and name identification data to facial photographic data and name identification data comprised in said data storage means and automatically assigns a value indicative of entry clearance status based upon pre-established parameters;

wherein said computer means automatically compares said data regarding the purpose of visit to data comprised in said data storage means and automatically assigns another value indicative of entry clearance status based upon pre-established parameters;

wherein said computer means automatically compares said values indicative of entry clearance against pre-established parameters and enables said printing means to automatically generate a printed document containing a photo identification of said visitor and parameters of entry if said comparison is within pre-established parameters.

2. The method of claim 1 wherein said visitor responsive data input means comprises a card swipe data entry means.

3. The method of claim 2 wherein said card swipe data entry means is enabled to read data contained on a government issued driver's license.

4. The method of claim 3 wherein data comprised on said government issued driver's license is compared to electronic data maintained in remote government data storage means pertaining to said driver.

5. The method of claim 3 wherein said driver's license comprises facial photo identification which is compared by said arrangement to facial photo data of said visitor taken by said arrangement.

6. The method of claim 2 wherein said card swipe data entry means is enabled to read data contained on a credit card.

7. The method of claim 6 wherein said data comprised on said credit card is compared to electronic data maintained in remote data storage.

8. The method of claim 2 wherein the photographic data of said visitor is compared to photographic data maintained in a remote data storage bank.

9. The method of claim 8 wherein said remote data storage is selected from motor vehicle licensing data storage and criminal data storage.

10. The method of claim 1 wherein a visitor presented before said video monitor observes the facial image taken by said camera and is directed by instructions generated by said computer to proper positioning of his image for photographing.

11. The method of claim 1 comprising monitoring means arranged to enable remote monitoring of computer posed queries and visitor response data input thereto.

12. The method of claim 1 comprising means for providing auditory queries to said visitor by said computer.

13. The method of claim 1 comprising means for receiving auditory responses by said visitor to queries posed by said arrangement and converting said auditory responses to digital data usable by said computer.

14. The method of claim 1 wherein said arrangement posed queries are printed on said monitor screen.

15. The method of claim 1 said arrangement comprising a data input means selected from keyboard, keypad and touch screen data input means.

* * * * *